E. G. BUSSE.
BRAKE BEAM.
APPLICATION FILED JULY 21, 1921.
1,421,064.
Patented June 27, 1922.
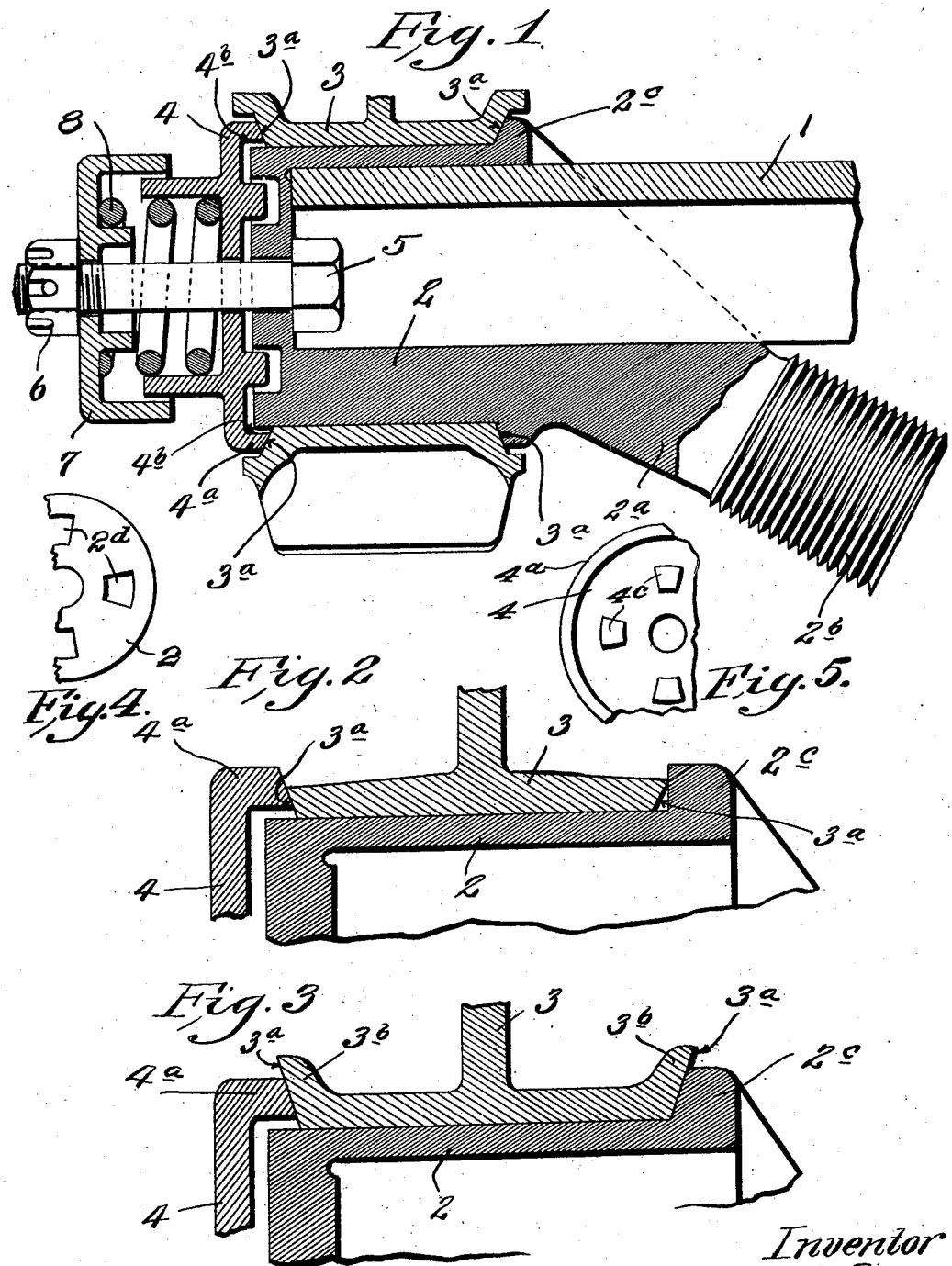
Inventor
Edwin G. Busse

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE BEAM.

1,421,064.      Specification of Letters Patent.     Patented June 27, 1922.

Application filed July 21, 1921. Serial No. 486,544.

*To all whom it may concern:*

Be it known that I, EDWIN G. BUSSE, a citizen of the United States, residing at the city of Chicago, county of Cook, and State of Illinois, have invented a certain new and useful Improvement in Brake Beams, of which the following is a full, clear, and exact description, such as will enable others skilled in the art to which it appertains to make and use the same, reference being had to the accompanying drawings, forming part of this application, in which—

Figure 1 is a side elevational view, partly in section, of my improved brake beam.

Figure 2 is a detail view of a modified form of my invention.

Figure 3 is a detail view of another modified form of my invention.

Figure 4 is a partial elevational view of the end of the sleeve on which the brakehead is mounted.

Figure 5 is a partial elevational view of the inner face of the locking plate.

This invention relates to a new and useful improvement in brake beams, and is designed particularly as an improvement on that type of brake beams illustrated in a companion joint application filed by Charles Haines Williams and myself on the 28th day of July, 1921.

The object of this present invention is to provide means on the brake head tending at all times to center the locking member and utilizing the same or different means tending to center head on the sleeve or trunnion at all times notwithstanding wear between the two.

In the drawings, 1 indicates the compression member preferably U-shaped in cross section and 2 the sleeve, as it is called, which forms a trunnion on which the brake head 3 is mounted. This brake head may be of the automatically adjustable type, as is well known in the art.

The sleeve 2 has an inwardly extending shank 2ª terminating in a threaded portion 2ᵇ for co-operation with a coupling by which the tension member is secured to the sleeve.

4 is the locking plate which is arranged upon an axially disposed bolt 5 having a castellated nut 6 on its outer end for holding a follower 7 in position. 8 indicates a coiled spring interposed between the follower 7 and the locking plate 4. This locking plate is preferably provided with inwardly extending marginal flanges 4ª whose edges are chamfered or beveled, as shown in Figure 1, for co-operating with the beveled edges 3ª at the ends of the barrel portion of the brake head. As the brake head is reversible so that it can be used at the right or left hand end of a beam, both sides of the head are provided with these beveled edges 3ª. The sleeve 2 at the inner end of the trunnion is provided with a flange 2ᶜ against which the brake head is yieldingly held by means of the pressure exerted by spring 8 and the inner face of this flange 2ᶜ is beveled so as to co-operate with the beveled edge 3ª of a brake head, thus tending to keep the brake head central with respect to the trunnion at all times. The ends of the barrels of brake heads are differently shaped in practice. Where they are flangeless, as shown in Figure 2, the beveling of the edges of the barrel will not offer an inclined surface of any considerable area to the beveled edge of the flange 4ª of the locking plate; but even with brake heads of this type I deem the extent of surface contact between the locking plate and the head to be sufficient to center the head relative to the locking plate.

In Figure 2 I have also shown the flange 2ᶜ at the inner end of the trunnion as presenting a square shoulder to the brake head. This square shouldered flange is extensively employed to-day on different railroads, as are also flangeless brake head barrels, but by beveling both ends of the barrel, a right or left brake head is produced which can be utilized with a beveled edged locking plate. Of course in this construction the flange at the inner end of the trunnion does not serve to center the brake head but there are centering means present with relation to the brake head and locking plate.

In Figure 3, I have shown the ends of the barrel of the brake head reinforced by flaring flanges 3ᵇ and these offer an extended area with which beveled flange 4ª of the plate can comprehensively co-operate. It will be noted with respect to Figure 1 that the shoulder 4ᵇ formed by the flange on locking plate 4, by embracing the end of the trunnion, constitutes a limit stop which prevents lateral displacement of the locking plate relative to the head; but where the head is flush with or extends slightly beyond the end of the trunnion, as sometimes happens, due to irregularities of manufacture, it is obvious that such a construction would eliminate the limit stop referred to, and I, therefore, propose to extend the reinforcing flange of the brake head outwardly as at 3$^b$, so as to provide a limit stop or shoulder to prevent lateral displacement of the locking plate relative to the brake head. Some limiting means should be provided, because the locking plate is free or floating to the extent of the clearance or lost motion provided between the parts.

I also prefer to provide lugs 4$^c$ on the locking plate which are designed to enter recesses 2$^d$ in the end of the sleeve 2 for the purpose of preventing rotation of the locking plate relative to the sleeve or trunnion (see Figures 1, 4 and 5).

What I claim is:

1. The combination with the trunnion of a brake beam, of a brake head mounted thereon, the outer end of the barrel portion of said brake head having a beveled edge, and a centering device cooperating therewith.

2. The combination with a trunnion of a brake beam, of a brake head mounted thereon, the barrel portion of said head having beveled edges at each end and centering devices at each end of said trunnion for cooperating therewith.

3. The combination with the trunnion of a brake beam, of a brake head mounted thereon, the barrel portion of said brake head having a beveled edge, and a yielding locking plate whose marginal edges cooperate therewith.

4. The combination with the trunnion of a brake beam, of a brake head mounted thereon, the barrel portion of said brake head having a beveled edge, and a floating locking plate whose marginal edges cooperate therewith.

5. The combination with the trunnion of a brake beam, of a brake head mounted thereon, a separable locking plate mounted on the trunnion, and means on the plate for centering the head on the trunnion.

6. The combination of a brake head, and a part engaging the marginal edges of said head for holding the same in position on a brake beam, there being means on one of said parts for centering the other.

7. The combination of a brake head, and a part engaging the marginal edges of said head for holding the same in position on a brake beam, there being means on the holding part for centering the head.

8. The combination of a brake head, and a part engaging the marginal edges of said head for holding the same in position on a brake beam, there being means on the brake head for centering the holding part.

9. The combination with the trunnion of a brake beam, of a brake head mounted thereon, and means on the outer end of the trunnion for centering the head relative thereto, independently of wear between the parts.

10. The combination of a brake head, a part for holding the same in position on a brake beam, there being means on one of said parts for centering the other, and means for limiting the relative centering movement between the parts.

11. The combination of a brake head, a part for holding the same in position on a brake beam, there being means on the holding part for engaging the marginal outer edges of said head and thereby centering the head, and means for limiting the relative centering movement between the parts.

12. The combination of a brake head, a part for holding the same in position on a brake beam, there being means on the outer end of the brake head for centering the holding part, and means for limiting the relative centering movement between the parts.

13. The combination with the trunnion of a brake beam, of a brake head mounted thereon, means located at the outer end of the trunnion for centering the head relative thereto independently of wear between the parts, and means for limiting the relative centering movement between the parts.

14. The combination with a trunnion member of a brake beam, of a brake head mounted thereon, a locking member mounted for direct engagement with said brake head, means for preventing independent rotation of said locking member relative to said trunnion member, means for yieldingly pressing the locking member against the brake head, and means on said locking means for centering the brake head on the trunnion.

15. The combination with a trunnion member of a brake beam, of a brake head mounted thereon, a locking member mounted for direct engagement with said brake head, means for preventing independent rotation of said locking member relative to said trunnion member, means for yieldingly pressing the locking member against the brake head, and means on said trunnion for centering the brake head relative thereto.

16. The combination with a trunnion member of a brake beam, of a brake head mounted thereon, a locking member mounted for direct engagement with said brake head, means for preventing independent rotation of said locking member relative to said trunnion member, means for yieldingly pressing the locking member against the brake head, and means on said trunnion and locking member for centering the brake head relative to the trunnion.

17. The combination with the trunnion member of a brake beam, of a brake head mounted thereon, a locking member mounted for longitudinal movement relative to said trunnion, means for preventing rotation of said locking member relative to said trunnion, and means for centering said brake head relative to said trunnion.

18. The combination with the trunnion member of a brake beam, of a brake head mounted thereon, a locking member designed to marginally and directly engage said brake head, yielding means exerting pressure against the outer face of said locking member for normally permitting said brake head to move longitudinally along said trunnion, and means for centering said brake head relative to said trunnion.

19. A brake head having a barrel portion open at both sides and adapted to receive a trunnion, the edges of said barrel portion being beveled for the purposes described.

20. A locking plate for brake heads having a beveled marginally arranged surface for the purposes described.

In testimony whereof I hereunto affix my signature this 16th day of July, 1921.

EDWIN G. BUSSE.